(12) United States Patent
Keller et al.

(10) Patent No.: US 6,253,012 B1
(45) Date of Patent: Jun. 26, 2001

(54) CYCLED FIBER LOCK FOR CROSS-FUNCTIONAL TOTALLY DRY OPTICAL FIBER LOOSE TUBE CABLE

(75) Inventors: David A. Keller; John C. Rosko; Leslie P. Keller, all of Apex, NC (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/247,899

(22) Filed: Feb. 10, 1999

Related U.S. Application Data

(63) Continuation-in-part of application No. 09/190,706, filed on Nov. 12, 1998, now Pat. No. 6,178,278.

(51) Int. Cl.⁷ .................................................. G02B 6/44
(52) U.S. Cl. ........................ 385/109; 385/112; 385/113; 385/103; 385/106
(58) Field of Search ................................. 385/102–109, 385/112, 113

(56) References Cited

U.S. PATENT DOCUMENTS

| | | |
|---|---|---|
| H624 | 4/1989 | Handlin, Jr. et al. . |
| Re. 34,516 | 1/1994 | Houghton . |
| 2,373,115 | 4/1945 | Graves . |

(List continued on next page.)

FOREIGN PATENT DOCUMENTS

| | | |
|---|---|---|
| 0157516 | 10/1985 | (EP) . |
| 2404236 | 4/1979 | (FR) . |
| 2158963 | 11/1985 | (GB) . |
| 2172410 | 9/1986 | (GB) . |
| 58-10703 | 1/1983 | (JP) . |
| 60-61708 | 9/1985 | (JP) . |
| 63-197907 | 8/1988 | (JP) . |
| 1446583 | 12/1988 | (SU) . |

OTHER PUBLICATIONS

"Patent Abstract of SU," Patent No. SU–1446–583, Dec. 1988, "Multicore optical cable—has additional helical holes accommodating optical fibres and linked via seams to helical grooves", Mosc Communic Eng, V07 (Dec. 12, 1988).

"Patent Abstract of Japan," Patent No. 60–61708, (Apr. 9, 1985), Sugawara et al., "Optical Fiber Cable".

"Patent Abstract of Japan," Patent No. 63–197907, (Aug. 16, 1988), Kaino et al., "Optical Transmission Fiber Containing Linear Object For Optical Transmission Fiber Cable And Its Manufacture".

Patent Abstract of Japan, by Y. Tajima et al., "Submarine Optical Cable", Patent Application No. 56–10928 (Jul. 14, 1981).

(List continued on next page.)

*Primary Examiner*—Hung N. Ngo
(74) *Attorney, Agent, or Firm*—Ware, Fressola, Van Der Sluys & Adolphson LLP

(57) ABSTRACT

A cable includes an optical fiber, a buffer tube having the optical fiber arranged therein, and a thermoset material for connecting the optical fiber to the buffer tube. The thermoset material will not melt or appreciably soften and will maintain basic elastomeric flexibility in a temperature range of −40 to 70 degrees Celsius. The thermoset material may be a flame-retardant silicone elastomer, base and curing agent, as well as a liquid rubber molded compound, which is not flame-retardant. The thermoset material allows for fiber helix movement as the cable expands and contracts from −40 to +70 degrees Celsius, and is cyclically placed for connecting the optical fiber to the buffer tube at intervals of about every ½ meter, as well as at intervals of about every 10 meters. The cable is an indoor/outdoor flame retardant cable also having a fiberglass yarn matrix and a jacket, wherein either the buffer tube, the fiberglass yarn matrix, the jacket, or a combination thereof, is made from an optimal blend of polyvinylidene fluoride (PVDF) and flame retardant polyvinyl chloride (FRPVC). The indoor/outdoor flame retardant cable may have trace amounts of water swellable powder particles sprinkled on the optical fiber arranged inside the buffer tube.

60 Claims, 4 Drawing Sheets

U.S. PATENT DOCUMENTS

| | | |
|---|---|---|
| 3,100,981 | 8/1963 | Engle et al. . |
| 3,675,476 | 7/1972 | Zapfe . |
| 3,744,295 | 7/1973 | Allinikov . |
| 3,881,349 | 5/1975 | Stone . |
| 3,974,678 | 8/1976 | Rooney et al. . |
| 4,038,489 | 7/1977 | Stenson et al. . |
| 4,110,001 | 8/1978 | Olszewski et al. . |
| 4,155,963 | 5/1979 | de Vecchis et al. . |
| 4,176,240 | 11/1979 | Sabia . |
| 4,232,935 | 11/1980 | Rohner et al. . |
| 4,259,540 | 3/1981 | Sabia . |
| 4,347,735 | 9/1982 | Desai et al. . |
| 4,354,732 | 10/1982 | Arnaud et al. . |
| 4,388,800 | 6/1983 | Trezeguet et al. . |
| 4,389,088 | 6/1983 | Trezequet . |
| 4,401,366 | 8/1983 | Hope . |
| 4,403,499 | 9/1983 | Sack et al. . |
| 4,404,840 | 9/1983 | Burr et al. . |
| 4,422,889 | 12/1983 | Trezeguet et al. . |
| 4,456,331 | 6/1984 | Whitehead et al. . |
| 4,464,013 | 8/1984 | Sabia . |
| 4,474,426 | 10/1984 | Yataki . |
| 4,504,112 * | 3/1985 | Gould et al. ............. 350/96.23 |
| 4,514,058 | 4/1985 | Walton . |
| 4,577,925 * | 3/1986 | Winter et al. ............. 350/96.23 |
| 4,596,443 | 6/1986 | Diemeer et al. . |
| 4,645,628 | 2/1987 | Gill . |
| 4,661,406 | 4/1987 | Gruhn et al. . |
| 4,690,498 | 9/1987 | Priaroggia . |
| 4,701,016 | 10/1987 | Gartside, III et al. . |
| 4,703,998 | 11/1987 | Uchioke et al. . |
| 4,707,074 | 11/1987 | Heywood . |
| 4,711,523 | 12/1987 | Iri et al. . |
| 4,725,121 | 2/1988 | Priaroggia . |
| 4,725,122 | 2/1988 | Anelli et al. . |
| 4,740,054 | 4/1988 | Becker et al. . |
| 4,743,085 | 5/1988 | Jenkins et al. . |
| 4,752,113 | 6/1988 | Saito et al. . |
| 4,767,184 | 8/1988 | Ogasawara et al. . |
| 4,770,489 | 9/1988 | Saito et al. . |
| 4,772,089 | 9/1988 | Ide et al. . |
| 4,781,434 | 11/1988 | Kitagawa et al. . |
| 4,784,461 | 11/1988 | Abe et al. . |
| 4,784,462 | 11/1988 | Priaroggia . |
| 4,786,138 | 11/1988 | Buckley . |
| 4,793,686 | 12/1988 | Saito . |
| 4,802,732 | 2/1989 | Fukuma et al. . |
| 4,804,245 | 2/1989 | Katayose et al. . |
| 4,807,962 | 2/1989 | Arroyo et al. . |
| 4,818,060 | 4/1989 | Arroyo . |
| 4,820,014 | 4/1989 | Nishimura et al. . |
| 4,826,279 | 5/1989 | Nishimura et al. . |
| 4,830,459 | 5/1989 | Chicken et al. . |
| 4,840,453 | 6/1989 | Kitayama . |
| 4,842,366 | 6/1989 | Sawada et al. . |
| 4,859,025 | 8/1989 | Houghton . |
| 4,892,382 * | 1/1990 | Stroy et al. ............. 350/96.23 |
| 4,902,097 | 2/1990 | Worthington et al. . |
| 4,944,570 | 7/1990 | Oglesby et al. . |
| 4,953,942 | 9/1990 | Sasaki . |
| 4,960,068 | 10/1990 | Schotter . |
| 4,960,318 | 10/1990 | Nilsson et al. . |
| 4,964,691 | 10/1990 | Nelson et al. . |
| 4,975,232 | 12/1990 | Hattori et al. . |
| 4,983,013 | 1/1991 | Dotzer et al. . |
| 4,997,257 | 3/1991 | Spedding . |
| 5,013,126 | 5/1991 | Hattori et al. . |
| 5,037,763 | 8/1991 | Petisce . |
| 5,039,197 | 8/1991 | Rawlyk . |
| 5,050,957 | 9/1991 | Hamilton et al. . |
| 5,050,960 | 9/1991 | Sutehall . |
| 5,067,791 | 11/1991 | Nishiyama . |
| 5,071,221 | 12/1991 | Fujitani et al. . |
| 5,082,380 | 1/1992 | Sutehall et al. . |
| 5,087,110 | 2/1992 | Inagaki et al. . |
| 5,126,167 | 6/1992 | Matsuno et al. . |
| 5,136,673 | 8/1992 | Yoshizawa et al. . |
| 5,177,809 | 1/1993 | Zeidler . |
| 5,179,611 | 1/1993 | Umeda et al. . |
| 5,187,763 | 2/1993 | Tu . |
| 5,188,883 | 2/1993 | Rawlyk . |
| 5,193,134 | 3/1993 | Pizzorno et al. . |
| 5,199,094 | 3/1993 | Schneider . |
| 5,202,945 | 4/1993 | Foertsch . |
| 5,212,756 | 5/1993 | Eoll . |
| 5,218,659 | 6/1993 | Schneider . |
| 5,222,177 | 6/1993 | Chu et al. . |
| 5,222,178 | 6/1993 | Betker et al. . |
| 5,224,190 | 6/1993 | Chu et al. . |
| 5,224,192 | 6/1993 | Wagman . |
| 5,233,678 | 8/1993 | Katurashima et al. . |
| 5,249,249 | 9/1993 | Eoll et al. . |
| 5,274,725 | 12/1993 | Bottoms, Jr. et al. . |
| 5,289,556 | 2/1994 | Rawlyk et al. . |
| 5,293,443 | 3/1994 | Eoll et al. . |
| 5,343,549 * | 8/1994 | Nave et al. ............. 385/103 |
| 5,358,664 | 10/1994 | Brauer . |
| 5,377,290 | 12/1994 | Ohta et al. . |
| 5,380,472 | 1/1995 | Schneider . |
| 5,408,562 | 4/1995 | Yoshizawa et al. . |
| 5,435,944 | 7/1995 | Shackleton . |
| 5,495,546 | 2/1996 | Bottoms, Jr. et al. . |
| 5,517,591 | 5/1996 | Wagman et al. . |
| 5,533,382 | 7/1996 | Clerkin . |
| 5,542,020 | 7/1996 | Horska . |
| 5,561,729 | 10/1996 | Parris . |
| 5,561,730 | 10/1996 | Lochkovic et al. . |
| 5,566,266 | 10/1996 | Navé et al. . |
| 5,684,904 | 11/1997 | Bringuier et al. . |
| 5,698,615 | 12/1997 | Polle . |
| 5,748,823 | 5/1998 | Navé . |

OTHER PUBLICATIONS

J.T. Chapin et al., "Comparison Of Fire Behavior Of Copper And Fiber Optic Cable In Large And Full Scale Fire Test Facilities", International Wire and Cable Symposium, 1997 pp 775–784.

Siegfried Richter et al., "Testing Of Cables For Fire Resistance A Comparison Of U.S. And European Standards", International Wire and Cable Symposium, 1997, pp 752–760.

Michael R. Ellwanger et al., "High Fiber Count Indoor/Outdoor Fiber Optic Cable", NFOEC Proceedings, 1996, pp 371–380.

Allan Kaiser et al., "Indoor/Outdoor Fiber Optic Cable", NFOEC Proceedings, 1996, pp 347–355.

Paul C. Hiemenz, "Polymer Chemistry, The Basic Concepts," pp. 262–263 and 314, Marcel Dekker, Inc., 2nd Edition, 1984.

John C. Kotz and Keith F. Purcell, "Chemistry & Chemical Reactivity," pp. 1139–1143, Saunders College Publishing, 2nd Edition, 1991.

Michael R. Lindeburg, P.E., "Engineering–in–Training Reference Manual," pp. 34–15, Professional Publications, Inc., 8th Edition, 1992.

"Patent Abstract of Japan," Patent Application No. 56–039503, (Apr. 15, 1981), T. Fujio, "Optical Submarine Cable".

"Information About High Technology Silicone Materials," (Sylgard® 184 Silicone Elastomer, Base & Curing Agent), Dow Corning Corporation, 1991.

* cited by examiner

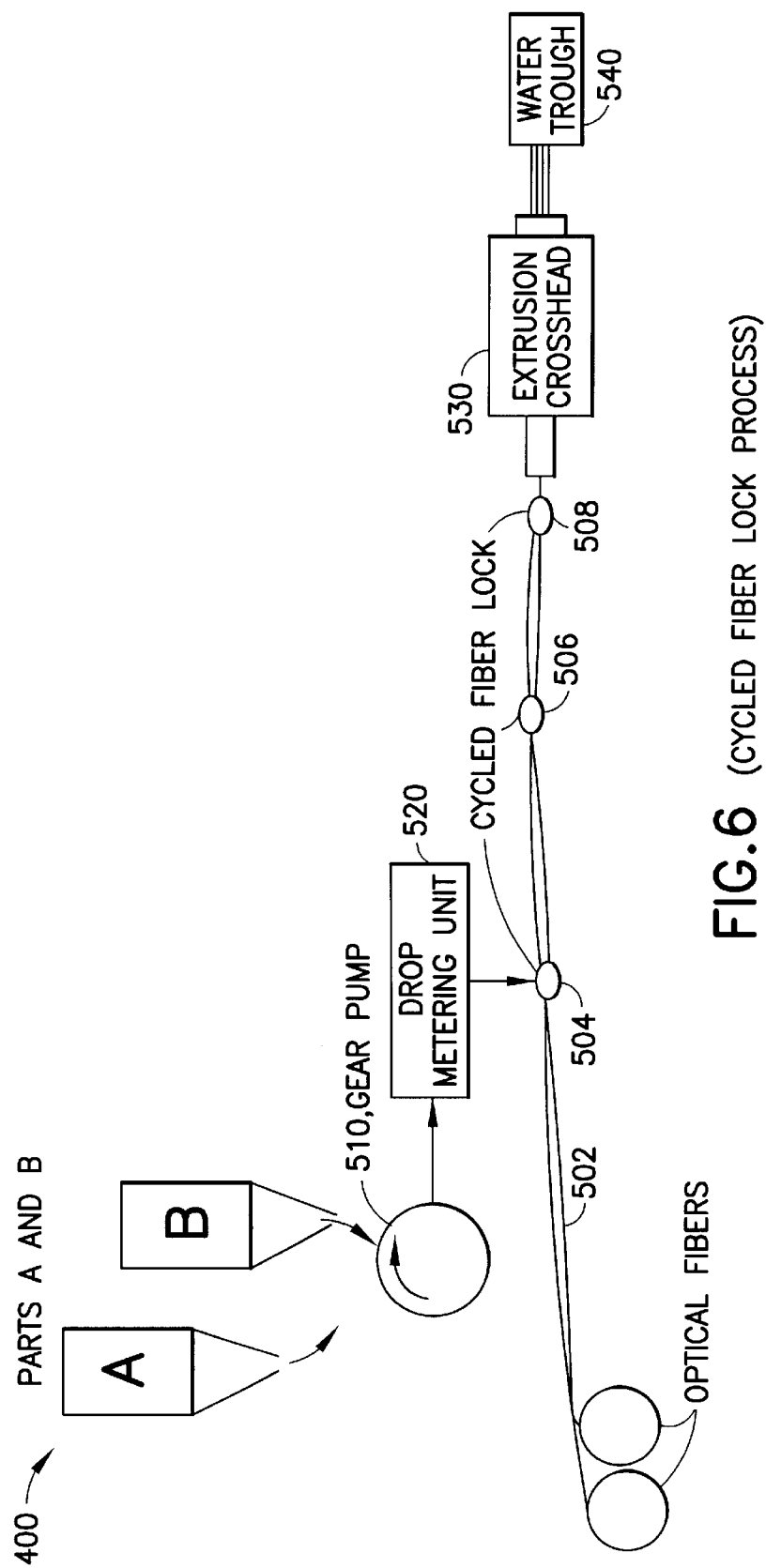
FIG.6 (CYCLED FIBER LOCK PROCESS)

CYCLED FIBER LOCK FOR CROSS-FUNCTIONAL TOTALLY DRY OPTICAL FIBER LOOSE TUBE CABLE

RELATED APPLICATIONS

This is a continuation-in-part application claiming benefit to a patent application having Ser. No. 09/190,706, filed Nov. 12, 1998 (WFVA No. 928-024-1), now U.S. Pat. No. 6,178,278, hereby incorporated by reference in its entirety.

BACKGROUND OF THE INVENTION

1. Technical Field

This invention relates to an optical fiber cable; and more particularly relates to an indoor/outdoor optical fiber cable that meets various competing industry standards such as peak flame, peak smoke, average smoke, compression and cold temperature bend tests.

2. Description of Related Art

Campus cables are known in the art and include four (4) categories, such as outdoor, outdoor-riser, riser and plenum cable designs. Balancing the industry specifications with current demand, results in strategic performance targets for such cables which include flame peak, smoke peak, average smoke, cold bend, compression, and temperature cycling attenuation.

Campus cables with components made of polyvinyl chlorides (PVC) have a difficult time consistently passing the average smoke requirement for the Underwriters Laboratory (UL) 910 test; while cables with components made of polyvinylidene fluorides (PVDF) generate very little smoke but do not process well when pressure extruded around fiberglass yarns.

Existing yarn-matrix units with or without water swellable powder are not flame and smoke retardant. Some yarn-matrix combinations exhibit low smoke and relatively low flame but do burn easily and are not considered flame retardant.

In the prior art, when running cable between buildings, an indoor plenum cable is used in combination with an outdoor cable. One of the major disadvantages of this approach is that the indoor plenum cable must be spliced to the outdoor cable and the cost of splicing is more expensive than the actual cost of the cable.

Patentability searches were conducted in the United States Patent and Trademark Office for patents related to an indoor/outdoor cable using plenum (i.e. flame retardant) material, as well as a combined indoor/outdoor cable using polyvinylidene fluoride (PVDF) in combination with flame retardant polyvinyl chloride (FRPVC). The results of the patentability searches are described in the aforementioned patent application Ser. No. 09/190,706.

Moreover, when cables are used in a riser application, the optical fiber must be held in a buffer tube so it does not fall out during installation. Many different methods are known in the art for holding the optical fibers inside the buffer tube in a cable.

Cables having buffer tubes without gel are known, but must be coiled intermittently at various elevations to prevent the optical fibers or optical fiber ribbons within from slipping to a lower level. However, even though coiling may be used, there is still the need to prevent water ingress and allow some coupling of the fiber to the tube for riser applications.

Cables are also known for having a tight structure or semi-tight structure such as a micro tube for holding optical fiber or optical fiber ribbon in place. However, such cables have the problem of requiring a stripping, scoring or shaving step of the buffer tube to access the fiber therein which causes damage to the fiber.

Cables are also known for having gel for holding optical fiber or optical fiber ribbon in place, preventing water ingress in the buffer tube and allowing for fiber helix movement as the cable expands and contracts due to temperature. However, such cables have the problem of removing the gel with a solvent wipe removal or other messy cleanup after working on the cable. See also U.S. patent application Ser. No. 09/090,169, filed Jun. 4, 1998, hereby incorporated by reference in its entirety, which shows cyclically placed grease segments for holding fibers in a determined position, separated by segments having no grease.

Many other U.S. Pat. Nos. 5,224,192; 5,187,763; 4,464,013; and 4,176,240 show and describe cables having a filling material or compound between a sheath and optical fiber, none of which are cyclically placed. See also European patent application no. 0157516. U.S. Pat. No. 4,232,935 (Alcatel Reference no. 90365) shows and describes a communications cable having an optical waveguide, a corrugated metallic tubular member and a filler material for continuously or discontinuously connecting the optical waveguide to the corrugated tubular member. As described in U.S. Pat. No. 4,232,935, column 2, lines 21–36, the filler material is a foamy material, a powder, petrolata that are vaseline-like and consist of waxes and oils (which has a thick consistency at room temperature and becomes more fluid at higher temperatures), high molecular polymers, plastic or material based on bitumen or polybutene. U.S. Pat. No. 4,232,935 does not describe that any filler material is a thermoset material. See also JP-56 039 503, which describes a cable having super hard ceramics which would not solve the problem of the need for movement during processing, yet yields a soft fiber-lock after processing.

A patentability search was also conducted in the United States Patent and Trademark Office for patents related to a cable having trace amounts of water swellable powder sprinkled on the optical fiber, and the following patents were found:

U.S. Pat. No. 4,401,366 discloses a fiber optic cable that includes a central core 12 with grooves 16 supporting optical waveguides 18 within an outer sheath 22, as shown in FIG. 1. A mixture of hydrophilic powder and hydrophobic powder is included around the waveguides as described in column 3, lines 58–68.

U.S. Pat. No. 5,684,904 discloses an optical fiber cable that includes buffer tubes 20 wherein a coating formed from a mixture of moisture-absorptive powder and resin is applied to the inner buffer tube surface, outer buffer tube surface or both inner and outer surfaces. FIG. 2 shows a coating 19 on the inner surface of a buffer tube 8, and FIG. 3 shows all of the suggested coating alternatives, as described in column 3, lines 42–60, and column 4, lines 35–42.

U.S. Pat. No. 5,698,615 discloses optical cables that include a filler material composed of water swellable powder and an additive powder, as shown in FIG. 7 and described in column 10, lines 57–64. The filling compounds have been used in electrical and optical cables, as described in the paragraph bridging columns 13 and 14.

Japanese Patent No. 58-10703 discloses an optical fiber cable that includes polyacrylamide powder in the spaces between fibers to function as a water blocking material.

Most of the prior art references, including U.S. Pat. No. 5,698,615, use composite material having water swellable powder which cause microbending in the fiber under certain cold temperature conditions. See U.S. Pat. No. 5,698,615, FIG. 6, filling compound FC2.

See also United Kingdom patent application no. 2 172 410 A that shows and describes an optical cable containing hydrogen trapping powder coated on a substrate tape.

The subject matter of all of the aforementioned United States and foreign patent applications and patents are hereby incorporated by reference.

SUMMARY OF THE INVENTION

In its broadest sense, the present invention provides a cable having an optical fiber, a buffer tube having the optical fiber arranged therein, and a thermoset material for frictionally-connecting the optical fiber to the buffer tube.

A thermoset material is capable of becoming permanently solid when heated or cured and is also known in the art as a crosslinked polymeric material. (Compare: A thermoplastic An material that is capable of softening or fusing when heated and of hardening again when cooled.) In the present invention, the thermoset material may be a flame-retardant product of Dow Corning named SYLJRD Silguard 184 silicone elastomer, base and curing agent, or a Liquid Rubber—Rubber Molded Compound (PMC-121/40, Parts A and B), which is not flame-retardant, but may be applied about every 0.5–30 meters. The thermoset material will not melt or appreciably soften and will maintain basic elastomeric flexibility in a temperature range from −40 to +85 degree Celsius. The thermoset material allows for fiber helix movement as the cable expands and contracts in the temperature range from −40 to +70 degrees Celsius, and is cyclically placed for frictionally-connecting the optical fiber to the buffer tube at intervals of about every ½ meter, as well as at intervals of about every 10 meters or longer to 30 meters.

In the present invention, the cable is used as an indoor/outdoor cable, which has a fiberglass yarn matrix and a jacket. The fiberglass yarn matrix has fiberglass yarns and is arranged about the buffer tube. The fiberglass yarn matrix may have one or more layers of fiberglass yarn, i.e. a single layer, a dual layer, etc. In one embodiment, the fiberglass yarn is made from water-swellable yarn. The jacket is arranged about the fiberglass yarn matrix. Either the jacket, the buffer tube, fiberglass yarn matrix, or a combination thereof, is made from an optimum blend of flame retardant polyvinyl chloride (FRPVC) and polyvinylidene fluoride (PVDF) to form an indoor/outdoor flame retardant cable. The optimum blend is in a range of 30–60% PVDF to 70–40% FRPVC, and preferably in a ratio of about 50% PVDF and 50% FRPVC. Embodiments are also envisioned wherein the optimal blend is in a range of 5–15% PVDF to 95–85% FRPVC. The scope of the invention is not intended to be limited to any particular cable, and embodiments are envisioned for a cable having loose tubes, as well as a cable made of 100% PVDF.

The indoor/outdoor cable may also have trace amounts of water swellable powder particles sprinkled on the optical fiber arranged inside the buffer tube. The diameter of the water swellable powder particles are less than 50 microns, are in a range of 10–50 microns, and are applied on the optical fiber with about 0.10–1.0 grams per meter. The water swellable powder is made from a copolymer blend of polyacrylate and polyalcohol resins.

The use of water swellable powder allows the distance between segments to be much greater, up to an estimated 10 meters. This would decrease the filling usage of water swellable powder in the cable by as much as a factor of 10. In the present invention, the coupling of the water swellable powder and the cycled fiber lock provides water ingress prevention at any point along the tube.

The cable of the present invention may be used as a ribbon riser cable where the inner diameters and free spaces of the tubes are typically larger and where typical gel or grease would otherwise migrate down in a vertical or riser application, and where gels or greases do not afford as much flame retardant protection as the thermoset (also known as crosslinked) material.

The advantages of the cycled fiber lock design include, but are not limited to, providing a totally dry, flame retardant cable for riser applications that does not require riser coils. The use of the cycled fiber lock design in conjunction with water swellable powder provides for total water ingress prevention. The cycled fiber lock design results in a 25% reduction in cable end preparation time.

In effect, the present invention provides a dry indoor/outdoor flame-retardant cable that passes the flame retardancy requirements for indoor UL-rated plenum cables, the cold shrinkage requirements for outdoor cables, and does not use gel inside the buffer tube. The new dry indoor/outdoor flame-retardant cable uses a unique new blend of flame retardant polyvinyl chloride (FRPVC) and polyvinylidene fluoride (PVDF). Testing has shown that the optimal blend for the cable jacket is in a range of 30–60% of PVDF and 70–40% FRPVC. In this range, the new dry indoor/outdoor flame-retardant cable meets the highest flame retardancy standard, the highest cold temperature standard, as well as other demanding cable industry standards in the temperature range from −40 to +70 degrees Celsius.

Overall, the present invention provides an intricate cable design that meets the competing demands of an indoor/outdoor cable and satisfies a real need in the art. The cable has important applications in multi-building complexes such as a group of corporate office buildings or a college campus, where a cable must be run from one building to another. Inside a building, flame retardancy is a principle concern. Outside a building, cold shrinkage is a principle concern. The new dry indoor/outdoor flame-retardant cable eliminates the need for approximately half the required splicing, which results in a significant cost savings for installing the cable in multi-building complexes.

The new cable design also eliminates the need for gel or other material requiring solvent wipe removal from a buffer tube of a cable, while at the same time preventing water ingress in the buffer tube and allowing for fiber helix movement as the cable expands and contracts in the temperature range from −40 to +70 degrees Celsius.

Some other advantages of the new indoor/outdoor cable design include the following:

1) Flexibility, crush, cold temperature bend and flame retardant characteristics and process-ability are more easily achieved with a blend of PVDF and FRPVC than either material used individually.

2) The dry-loose buffer tube design using water swellable powder on the optical fiber eliminates the need for gels that are flammable, as well as for gels that are flame retardant but expensive.

3) Thermoplastic, flame retardant, smoke inhibiting, water swellable matrix comprised of a PVDF/FRPVC blend with or without water swellable powder which encloses fiberglass yarns can provide a tensile and anti-buckling strand for a key assembly element for flexible optical fiber or composite cables.

A DESCRIPTION OF THE DRAWING

For a fuller understanding of the nature of the invention, reference should be made to the following detailed descriptions taken in connection with the accompanying drawings, not in scale, in which:

FIG. 6 is a diagram of a process for providing cycled fiber locks on an optical fiber.

BEST MODE FOR CARRYING OUT THE INVENTION

Figure 1:
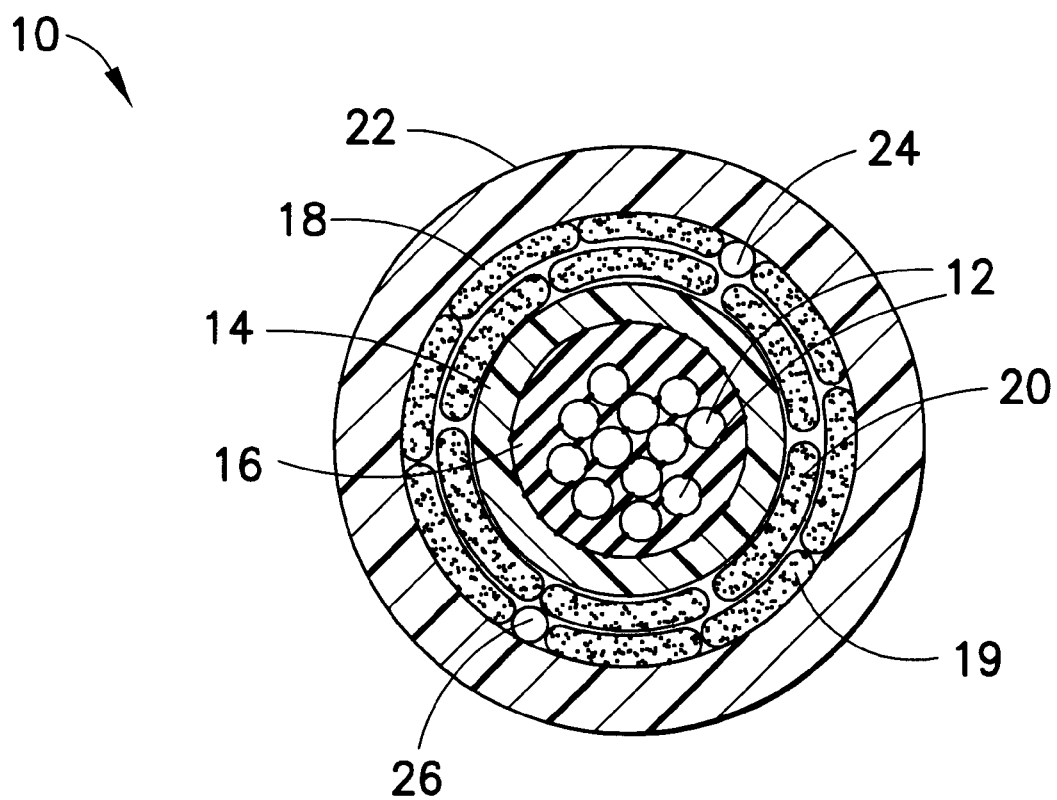
FIG. 1 is a diagram of a cross-section of an optical fiber cable that is the subject matter of the present invention.

Cable 10 in FIG. 1

FIG. 1 shows a cable generally indicated as 10 having one or more optical fibers 12, a buffer tube 14 having the one or more optical fibers 12 arranged therein, and a thermoset material generally indicated as 16 (by hatching) for connecting the optical fiber to the buffer tube 14.

Thermoset Material

The thermoset material 16 may be a flame-retardant product of Dow Corning named SYLJRD Silguard 184 silicone elastomer, base and curing agent, or a Liquid Rubber—Rubber Molded Compound (PMC-121/40, Parts A and B), which is not flame-retardant, but may be applied about every 0.5–30 meters. Thermoset materials are known in the art, and include epoxy, melamine, natural rubber (polyisoprene) phenolic (phenol formaldehyde, Bakelite), polyester (DAP), silicone and urea formaldehyde. For a more complete description of the chemical and physical properties of thermoset materials, the reader is referred to pages 262–263 and 314 of "Polymer Chemistry, The Basic Concepts," 2nd Edition, by Paul C. Hiemenz, Marcel Dekker, Inc., 1984; page 1139–1143 of "Chemistry & Chemical Reactivity" by John C. Kotz and Keith F. Purcell, Saunders College Publishing, 1991, as well as page 34–15 of Engineering-in-Training Reference Manual, 8th Edition, by Michael R. Lindeburg, P.E. Professional Publications, Inc., 1992. The scope of the invention is intended to include any thermoset material that will not melt or appreciably soften or harden and will maintain basic elastomeric flexibility, especially in the temperature range from −40 to 85 degrees Celsius.

The thermoset material 16 is a low viscosity material that is cyclically placed as described below. After curing, the thermoset material 16 will not melt or appreciably soften or harden and will maintain basic elastomeric flexibility in the temperature range from −40 to +85 degrees Celsius. The thermoset material 16 allows for fiber helix movement as the cable expands and contracts the temperature range from −40 to +70 degrees Celsius, and connects the optical fiber to the buffer tube at intervals of about every ½ meter, as well as up to an interval of about every 10 meters or longer. The scope of the invention is intended to include any particular interval of cyclic placement thereof.

During manufacture of the cable, a cycled injection of the thermoset material is applied to the optical fiber. After 24 hours, the thermoset material converts to a low hardness elastomer in the buffer tube. The cycled placement may include dripping a 2-part mix of low viscosity material on the optical fiber, such as the flame-retardant product of Dow Corning named SYLJRD Silguard 184 silicone elastomer, base and curing agent. In less than ½ hour, the Dow Corning low viscosity material converts to the low hardness elastomer in the buffer tube. The resulting "rubber like" compound holds the optical fiber or optical fiber ribbon in place for riser applications, yet is dry to the touch and is easily removed from the optical fibers or optical fiber ribbons after curing in order to service the cable. The dry feel of thermoset material is due to a crosslinking process.

In comparison, a slow curing (24 hour) time for the Liquid Rubber—Rubber Molded Compound allows for gradual tube shrinkage and relaxation and repositioning of the optical fiber or optical fiber ribbon helix within the tube, prior to curing.

Indoor/Outdoor Flame Retardant Cable

In FIG. 1, the cable 10 is an indoor/outdoor flame retardant cable that also has a fiberglass yarn matrix generally indicated as 18 having one or more layers of fiberglass yarns 19, 20 being arranged about the buffer tube 14; and a jacket 22 being arranged about the fiberglass yarn matrix 18. As shown, the indoor/outdoor flame-retardant cable 10 also has ripcords 24, 26 for pulling to access and service the optical fiber inside the cable.

Either the buffer tube 102, the fiberglass yarn matrix 104, the jacket 110, or a combination thereof, is made from an optimal blend of polyvinylidene fluoride (PVDF) and flame retardant polyvinyl chloride (FRPVC). The optimal blend is in a range of 30–60% of PVDF and 70–40% FRPVC, and preferably in a ratio of 50% PVDF and 50% FRPVC. Embodiments are also envisioned wherein the optimal blend is in a range of 5–15% PVDF to 95–85% FRPVC. In this range, the new dry indoor/outdoor flame-retardant cable meets the highest flame retardancy standard, the highest cold temperature standard, as well as other demanding cable industry standards set forth in patent application Ser. No. 09/190,706.

The fiberglass yarn matrix 18 includes strands of fiberglass in a yarn matrix. As shown, the fiberglass yarns may include water-swellable material, which are known in the art as water-swellable yarns, although the scope of the invention is not intended to be limited to only such yarns. A person skilled in the art would appreciate how to construct a cable like the one shown in FIG. 1, having a combination of one or more optical fibers arranged in a buffer tube, a fiberglass yarn matrix wrapped around the buffer tube, and a jacket 110 arranged about the fiberglass yarn matrix, which is shown and described in greater detail in patent application Ser. No. 09/190,706. The scope of the invention is not intended to be limited to any particular way for doing the same.

Figure 2:
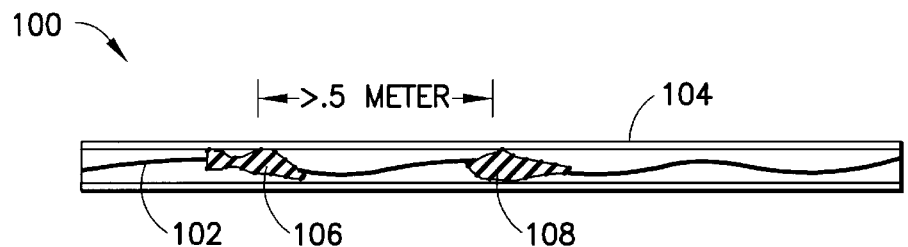
FIG. 2 is a diagram of another embodiment of a cable that is the subject matter of the present invention.

Cable 100 in FIG. 2

FIG. 2 shows a cable generally indicated as 100 having one or more optical fibers 102 arranged in a buffer tube 104, and having cyclically-placed thermoset material such as a low viscosity elastomer generally indicated as 106, 108 to hold the one or more optical fibers 102 in the buffer tube 104 at intervals of about every ½ meter. The cyclically-placed thermoset material 106, 108 prevents water ingress in the buffer tube 104, especially when used in combination with water swellable powder as discussed below, and allows for fiber helix movement as the cable expands and contracts in the temperature range from −40 to +70 degrees Celsius.

Figure 3:
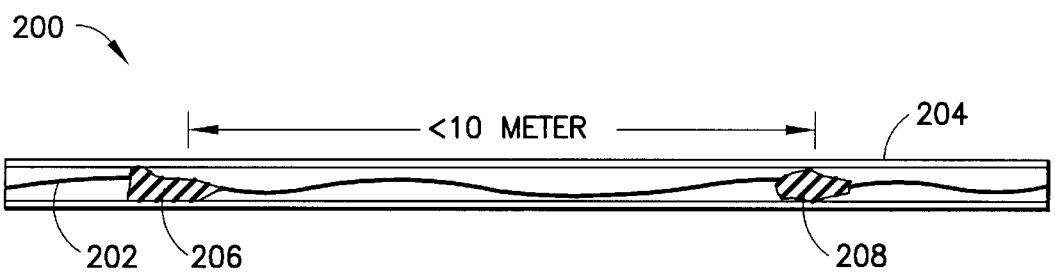
FIG. 3 is a diagram of another embodiment of a cable that is the subject matter of the present invention.

Cable 200 in FIG. 3

FIG. 3 shows a cable generally indicated as 200 having one or more optical fibers generally indicated as 202 arranged in a buffer tube 204, and having cyclically-placed thermoset material such as a low viscosity elastomer generally indicated as 206, 208 to hold the one or more optical fibers 202 in the buffer tube 204 at intervals of about every 10 meters.

Figure 4:
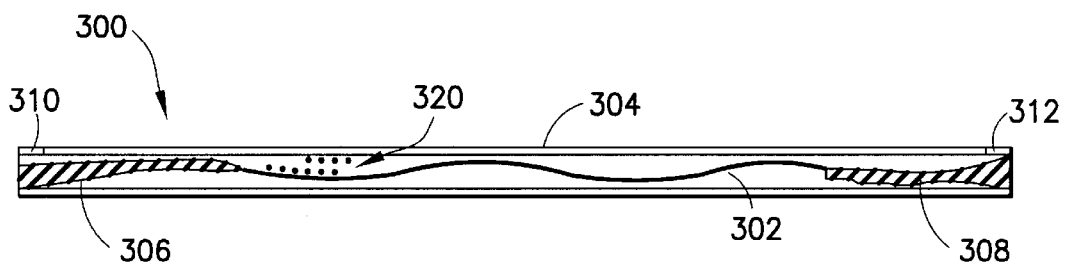
FIG. 4 is a diagram of another embodiment of a cable that is the subject matter of the present invention.

Cable 300 in FIG. 4

FIG. 4 shows a cable generally indicated as 300 having one or more optical fibers generally indicated as 302 arranged in a buffer tube 304, and having cyclically-placed thermoset material such as a low viscosity elastomer generally indicated as 306, 308 to hold the one or more optical fibers 302 in the buffer tube 304. The cyclically-placed low viscosity elastomer 306, 308 is a thin wavy section of material, which thickens at a mid section to contact the buffer tube wall generating a fiber friction lock when cured or crosslinked. The shape of the cyclically-placed low viscosity elastomer 306, 308 was discovered upon dissection of the tube after processing. Adjacent cyclically-placed low viscosity elastomers 306, 308 form an area or segment that contains trace amounts of water swellable powder and does not have to be filled for water ingress prevention.

In FIG. 4, the exterior surface of the cable jacket and/or the buffer tube 304 has markings 310, 312 to indicate the cycled placement position of the thermoset material in the event the cable has to be serviced and a technician needs to know the location of the cycled placement.

The advantages of the present invention include a 90% reduction in material filling usage and a 25% reduction in cable and preparation time. Slow 24 hour cure allows for even fiber distribution. Cycled fiber lock allows for fiber helix in cable construction.

Figure 5:
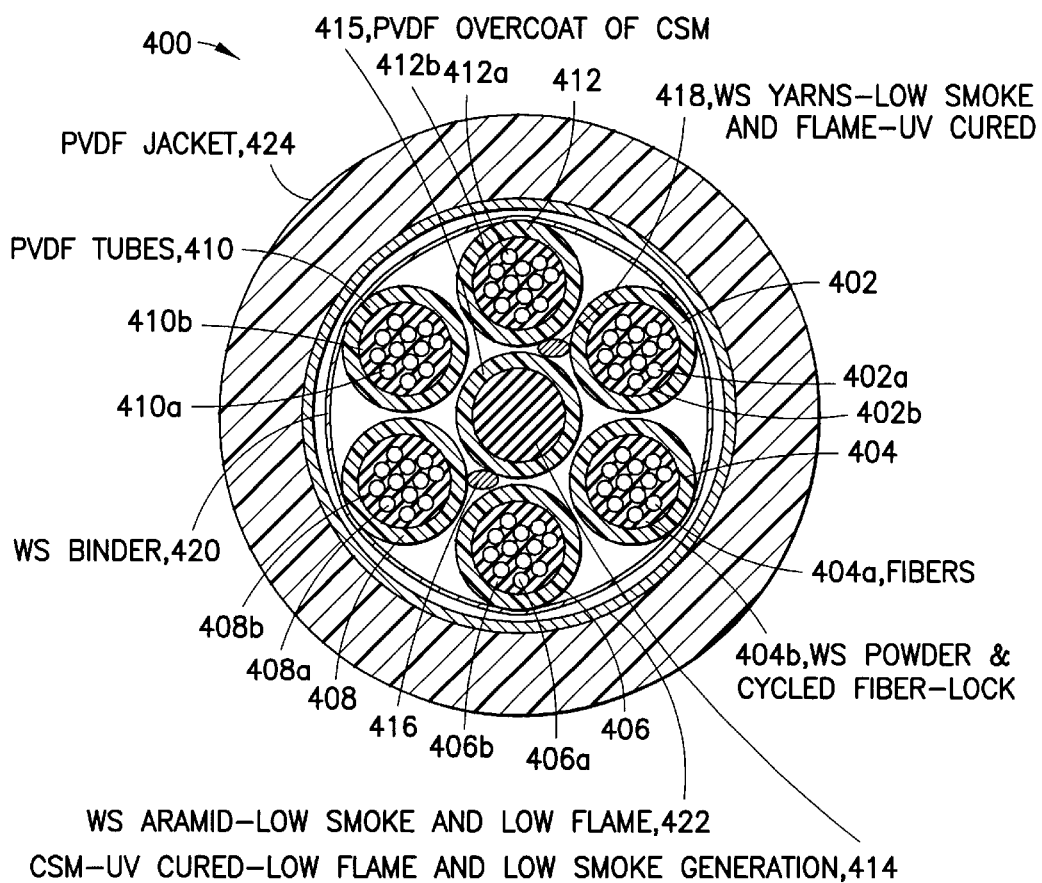
FIG. 5 is a diagram of a loose tube plenum indoor-outdoor cable that is the subject matter of the present invention.

Cable 400 in FIG. 5

FIG. 4 shows a loose tube plenum indoor-outdoor cable generally indicated as 400 having multiple buffer tubes 402, 404, 406, 408, 410, 412 arranged around a central strength member 414 having an overcoat 415. As shown, the multiple buffer tubes 402, 404, 406, 408, 410, 412 are made of a PVDF material, and the central strength member 414 and the overcoat 415 are a product of Owens Corning made of a UV cured low flame and smoke generation PVDF material. Each buffer tube 402, 404, 406, 408, 410, 412 has optical fibers 402a, 404a, 406a, 408a, 410a, 412a arranged therein. Each buffer tube 402, 404, 406, 408, 410, 412 also has cycled fiber locks, one of which is respectively shown in hatching as 402b, 404b, 406b, 408b, 410b, 412b. Each buffer tube 402, 404, 406, 408, 410, 412 also has water swellable powder (not shown) therein for absorbing water and other moisture.

A water swellable binder 420 is wrapped around the buffer tubes 402, 404, 406, 408, 410, 412. Water swellable yarns 416, 418 are arranged inside the water swellable binder 420. The water swellable yarns 416, 418 are low smoke and low flame yarn and are cured by ultraviolet light. A water swellable aramid yarn 422 is wrapped around the water swellable binder 420. The water swellable aramid yarn 422 is a low smoke and low flame yarn. A PVDF jacket 424 is arranged about the water swellable aramid yarn 422.

Cycled Fiber Lock Process in FIG. 6

FIG. 6 shows a cycled fiber lock process generally indicated as 500 having a part A, a part B, a gear pump 510, and a drop meter unit 520 for dropping a mixture of the part A and the part B onto optical fibers 502 to form cycled fiber locks 504, 506, 508. The cycled fiber lock process also includes steps using an extrusion crosshead 530 and a water trough 540.

Water Swellable Powder

The indoor/outdoor flame-retardant cables in FIGS. 1–5 may include water swellable powder particles generally indicated as 320 (as a series of dots) in FIG. 4 sprinkled on the one or more optical fibers 12, 102, 202, 302 arranged inside the buffer tube 14, 104, 204, 304. The water swellable powder particles are less than 50 microns, are in a range of 10–50 microns, and are applied on the one or more optical fiber 302 with about 0.10–1.0 grams per meter. During manufacture of the cable, the trace amounts of water swellable powder are electrostatically sprinkled on the one or more optical fibers before being arranged inside the dry-loose buffer tube. The water swellable powder completely eliminates the need for using messy and sloppy gel. The use of trace amounts of water swellable powder significantly reduces the adverse effects of microbending under certain cold temperature conditions. The water swellable powder also eliminates the need for a gel that might otherwise adversely react with the FRPVC in the buffer tube 304. The use of water swellable powder is the "dry" aspect of the dry-loose tube of the new dry indoor/outdoor flame-retardant cable.

There is strong demand in the industry for eliminating the need for using gel inside the buffer tube because it is sloppy and messy to deal with during splicing. The new dry indoor/outdoor flame-retardant cable takes advantage of important advances in new water swellable powders which are now capable of swelling in volume about 200 times to soak up undesirable water and moisture in the buffer tube.

The water swellable powder may be made from a copolymer blend of polyacrylate and polyalcohol resins. A polyacrylamide resin blend alone is not as safe for people or as stable as the newer copolymer blends. The polyacrylate/polyacrylamide copolymer blend is ground and kneaded into 1–300 micron particles. The polyacrylamide by itself allows for better absorption in salt water but is less friendly for the human body to flush out. The polyacrylate/polyalcohol blend is a safe material and is thus the component used in most baby diapers. It is a smaller and less rigid polymer chain than the two above, lends itself to less clumping, and can be rendered to a particle range of 1–106 microns which is then sifted or fluidized into a 10–50 micron particle range for use in the new indoor/outdoor cable design.

The smaller particle size of the polyacrylate/polyalcohol process and the safety issues allow it to be safely offered in a consumer product where the powder may freely float in the air and direct human handling is expected.

The polyacrylate/polyacrylamide products are currently, mostly relegated to agricultural use, and when they are used in the cabling industry, they are glued to a tape or substrate. They are not currently used in the free, unbonded form to any great extent.

Thus, the key element of this feature of the present invention is that a polyacrylamide alone is not safe for unattached use or likely to have a sufficiently small enough particle range to be used for the electrostatic application or for our current attenuation requirements.

A person skilled in the art would appreciate how to construct a cable having a combination of one or more optical fibers arranged in a buffer tube, a fiberglass yarn matrix wrapped around the buffer tube, and a jacket arranged about the fiberglass yarn matrix, and how to electrostatically sprinkled the water swellable powder on the one or more optical fibers before being arranged inside the dry-loose buffer tube. The scope of the invention is not intended to be limited to any particular way for doing the same.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the invention is intended to be claimed in a regular utility application to cover all of the generic and specific features of the invention herein described and all statements of the scope of the invention which, as a matter of language, might be said to fall therebetween.

What is claimed is:

1. A cable comprising:
   an optical fiber;
   a buffer tube having the optical fiber arranged therein;
   a thermoset material for frictionally-connecting the optical fiber to the buffer tube,
   wherein the thermoset material is liquid rubber—rubber molded compound, which is not flame-retardant, but is applied about every 0.5–30 meters.

2. A cable according to claim 1, wherein the thermoset material will not melt or appreciably soften or harden in a temperature range of −40 to +85 degrees Celsius.

3. A cable according to claim 1, wherein the thermoset material will maintain basic elastomeric flexibility in a temperature range of −40 to +70 degrees Celsius.

4. A cable according to claim 1, wherein the thermoset material is a flame-retardant silicone elastomer, base and curing agent that is easily removed from the fiber after drying.

5. A cable according to claim 1, wherein the thermoset material allows for fiber helix movement as the cable expands and contracts in a temperature range from −40 to +70 degrees Celsius.

6. A cable according to claim 1, wherein the thermoset material is cyclically placed for connecting the optical fiber to the buffer tube at intervals.

7. A cable comprising:
   an optical fiber;
   a buffer tube having the optical fiber arranged therein;
   a thermoset material for frictionally-connecting the optical fiber to the buffer tube,
   wherein the low viscosity elastomer includes a 2-part mix of low viscosity material for dripping on the optical fiber.

8. A cable according to claim 7, wherein the thermoset material will melt or appreciably soften or harden in a temperature range of −40 to +85 degrees Celsius.

9. A cable according to claim 7, wherein the thermoset material will maintain basic elastomeric flexibility in a temperature range of −40 to +70 degree Celsius.

10. A cable according to claim 7, wherein the thermoset material is a flame-retardant silicone elastomer, base and curing agent that is easily removed from the fiber after drying.

11. A cable according to claim 7, wherein the thermoset material allows for fiber helix movement as the cable expands and contracts in a temperature range from −40 to +70 degrees Celsius.

12. A cable according to claim 7, wherein the thermoset material is cyclically placed for connecting the optical fiber to the buffer tube at intervals.

13. A cable comprising:
    an optical fiber;
    a buffer tube having the optical fiber arranged therein;
    a thermoset material for frictionally-connecting the optical fiber to the buffer tube,
    wherein the thermoset material is cyclically placed for connecting the optical fiber to the buffer tube at intervals of about every 0.5–30 meters.

14. A cable according to claim 13, wherein the thermoset material will not melt or appreciably soften or harden in a temperature range of −40 to +85 degrees Celsius.

15. A cable according to claim 13, wherein the thermoset material will maintain basic elastomeric flexibility in a temperature range of −40 to +70 degrees Celsius.

16. A cable according to claim 13, wherein the thermoset material is a flame-retardant silicone elastomer, base and curing agent that is easily removed from the fiber after drying.

17. A cable according to claim 13, wherein the thermoset material allows for fiber helix movement as the cable expands and contracts in a temperature range from −40 to +70 degrees Celsius.

18. A cable according to claim 13, wherein the thermoset material is cyclically placed for connecting the optical fiber to the buffer tube at intervals.

19. A cable comprising:
    an optical fiber;
    a buffer tube having the optical fiber arranged therein;
    a thermoset material for frictionally-connecting the optical fiber to the buffer tube,
    wherein the buffer tube is marked with indicia to indicate the locations of the thermoset material.

20. A cable according to claim 19, wherein the thermoset material will not melt or appreciably soften or harden in a temperature range of −40 to +85 degrees Celsius.

21. A cable according to claim 19, wherein the thermoset material will maintain basic elastomeric flexibility in a temperature range of −40 to +70 degrees Celsius.

22. A cable according to claim 19, wherein the thermoset material is a flame-retardant silicone elastomer, base and curing agent that is easily removed from the fiber after drying.

23. A cable according to claim 19, wherein the thermoset material allows for fiber helix movement as the cable expands and contracts in a temperature range from −40 to +70 degrees Celsius.

24. A cable according to claim 19, wherein the thermoset material is cyclically placed for connecting the optical fiber to the buffer tube at intervals.

25. A cable comprising:
    an optical fiber;
    a buffer tube having the optical fiber arranged therein;
    a thermoset material for frictionally-connecting the optical fiber to the buffer tube, wherein the cable includes trace amounts of water swellable powder particles electrostatically sprinkled on the optical fiber arranged inside the buffer tube.

26. A cable according to claim 25, wherein the trace amounts of water swellable powder particles are less than 50 microns in diameter.

27. A cable according to claim 25, wherein the trace amounts of water swellable powder particles are applied on the optical fiber with about 0.10–1.0 grams per meter.

28. A cable according to claim 25, wherein the trace amounts of water swellable powder particles are less than 50 microns in diameter, and are applied on the optical fiber with about 0.10–1.0 grams per meter.

29. A cable according to claim 25, wherein the water swellable powder is made from a copolymer blend of polyacrylate and polyalcohol resins.

30. A cable according to claim 25, wherein the thermoset material will not melt or appreciably soften or harden in a temperature range of −40 to +85 degrees Celsius.

31. A cable according to claim 25, wherein the thermoset material will maintain basic elastomeric flexibility in a temperature range of −40 to +70 degrees Celsius.

32. A cable according to claim 25, wherein the thermoset material is a flame-retardant silicone elastomer, base and curing agent that is easily removed from the fiber after drying.

33. A cable according to claim 25, wherein the thermoset material allows for fiber helix movement as the cable expands and contracts in a temperature range from −40 to +70 degrees Celsius.

34. A cable according to claim 25, wherein the thermoset material is cyclically placed for connecting the optical fiber to the buffer tube at intervals.

35. An indoor/outdoor flame-retardant cable, comprising:
an optical fiber;
a buffer tube having the optical fiber arranged therein;
a fiberglass yarn matrix having fiberglass yarns and being arranged about the buffer tube;
a jacket being arranged about the fiberglass yarn matrix;
either the jacket, the buffer tube, the fiberglass yarn matrix, or a combination thereof, is made from an optimal blend of flame retardant polyvinyl chloride (FRPVC) and polyvinylidene fluoride (PVDF) in a range of 30–60% of PVDF and 70–40% FRPVC; and
a plurality of cycled fiber locks, each made from a thermoset material for frictionally-connecting the optical fiber to the buffer tube.

36. An indoor/outdoor flame-retardant cable according to claim 35, wherein the thermoset material will not melt or appreciably soften or harden in a temperature range of −40 to +70 degrees Celsius.

37. An indoor/outdoor flame-retardant cable according to claim 35, wherein the thermoset material will maintain basic elastomeric flexibility in a temperature range of −40 to +70 degrees Celsius.

38. An indoor/outdoor flame-retardant cable according to claim 35, wherein the thermoset material is a flame-retardant silicone elastomer, base and curing agent.

39. An indoor/outdoor flame-retardant cable according to claim 35, wherein the thermoset material is Liquid Rubber—Rubber Molded Compound (PMC-121/40, Parts A and B), which is not flame-retardant, but is applied about every 30 meters.

40. An indoor/outdoor flame-retardant cable according to claim 35, wherein the thermoset material allows for fiber helix movement as the cable expands and contracts in a temperature range from −40 to +70 degrees Celsius.

41. An indoor/outdoor flame-retardant cable according to claim 35, wherein the low viscosity elastomer includes a 2-part mix of low viscosity material for dripping on the optical fiber.

42. An indoor/outdoor flame-retardant cable according to claim 35, wherein the plurality of cycled fiber locks are cyclically placed for connecting the optical fiber to the buffer tube at intervals.

43. An indoor/outdoor flame-retardant cable according to claim 35, wherein the plurality of cycled fiber locks are cyclically placed for connecting the optical fiber to the buffer tube at intervals of about every 0.5–30 meters.

44. An indoor/outdoor flame-retardant cable according to claim 35, wherein the buffer tube is marked with indicia to indicate the locations of the thermoset material.

45. An indoor/outdoor flame-retardant cable according to claim 35, wherein the cable includes trace amounts of water swellable powder particles electrostatically sprinkled on the optical fiber arranged inside the buffer tube.

46. An indoor/outdoor flame-retardant cable according to claim 45, wherein the trace amounts of water swellable powder particles are less than 50 microns.

47. An indoor/outdoor flame-retardant cable according to claim 45, wherein the trace amounts of water swellable powder particles are applied on the optical fiber with about 0.10–1.10 grams per meter.

48. An indoor/outdoor flame-retardant cable according to claim 45, wherein the trace amounts of water swellable powder particles are less than 50 microns, and are applied on the optical fiber with about 0.10–1.0 grams per meter.

49. An indoor/outdoor flame-retardant cable according to claim 45, wherein the water swellable powder is made from a copolymer blend of polyacrylate and polyalcohol resins.

50. A cable comprising:
an optical fiber;
a buffer tube having the optical fiber arranged therein;
a thermoset material for frictionally-connecting the optical fiber to the buffer tube,
wherein the cable further comprises:
a fiberglass yarn matrix having fiberglass yarns and being arranged about the buffer tube;
a jacket being arranged about the fiberglass yarn matrix; and
either the jacket, the buffer tube, the fiberglass yarn matrix, or a combination thereof, is made from an optimal blend of flame retardant polyvinyl chloride (FRPVC) and polyvinylidene fluoride (PVDF) in a range of 30–60% of PVDF and 70–40% FRPVC.

51. A cable comprising:
an optical fiber;
a buffer tube having the optical fiber arranged therein;
a thermoset material for frictionally-connecting the optical fiber to the buffer tube,
wherein the cable further comprises:
a fiberglass yarn matrix having fiberglass yarns and being arranged about the buffer tube;
a jacket being arranged about the fiberglass yarn matrix; and
either the jacket, the buffer tube, the fiberglass yarn matrix, or a combination thereof, is made from 100% polyvinylidene fluoride (PVDF).

52. A cable comprising:
an optical fiber;
a buffer tube having the optical fiber arranged therein;

a thermoset material for frictionally-connecting the optical fiber to the buffer tube, wherein the cable is a loose tube cable having multiple buffer tubes, each buffer tube having a respective optical fiber and a respective thermoset material for frictionally-connecting the respective optical fiber to a respective buffer tube.

53. A cable according to claim 52, wherein the cable includes a central strength member having an overcoat; and wherein the multiple buffer tubes are arranged about the central strength member.

54. A cable according to claim 53, wherein the central strength member and the overcoat are made of a UV cured low flame and smoke generation PVDF material.

55. A cable comprising:

an optical fiber;

a buffer tube having the optical fiber arranged therein;

a thermoset material for frictionally-connecting the optical fiber to the buffer tube, wherein the thermoset material is dry to the touch after curing and can be easily peeled off the optical fiber.

56. A cable according to claim 55, wherein the thermoset material will not melt or appreciably soften or harden in a temperature range of −40 to +85 degrees Celsius.

57. A cable according to claim 55, wherein the thermoset material will maintain basic elastomeric flexibility in a temperature range of −40 to +70 degrees Celsius.

58. A cable according to claim 55, wherein the thermoset material is a flame-retardant silicone elastomer, base and curing agent that is easily removed from the fiber after drying.

59. A cable according to claim 55, wherein the thermoset material allows for fiber helix movement as the cable expands and contracts in a temperature range from −40 to +70 degrees Celsius.

60. A cable according to claim 55, wherein the thermoset material is cyclically placed for connecting the optical fiber to the buffer tube at intervals.

\* \* \* \* \*

UNITED STATES PATENT AND TRADEMARK OFFICE
CERTIFICATE OF CORRECTION

PATENT NO. : 6,253,012 B1
DATED : June 26, 2001
INVENTOR(S) : Keller et al.

Page 1 of 1

It is certified that error appears in the above-identified patent and that said Letters Patent is hereby corrected as shown below:

Title page,
Item [56], References Cited, U.S. PATENT DOCUMENTS, delete "4,892,382   Stroy et al." and insert -- 4,892,382     Story et al. --.

Column 9,
Line 63, delete "will melt" and insert -- will not melt --.

Signed and Sealed this

Twelfth Day of March, 2002

Attest:

Attesting Officer

JAMES E. ROGAN
Director of the United States Patent and Trademark Office